Dec. 12, 1967  J. J. MOONEY, JR  3,357,209
UNIVERSAL JOINT FOR A HYDROSTATIC TRANSMISSION
Filed Dec. 13, 1965

INVENTOR.
James J. Mooney, Jr.
BY
Paul Fitzpatrick
ATTORNEY

United States Patent Office 3,357,209
Patented Dec. 12, 1967

3,357,209
UNIVERSAL JOINT FOR A HYDROSTATIC TRANSMISSION
James J. Mooney, Jr., Indianapolis, Ind., assignor to General Motors Corporation, Detroit, Mich., a corporation of Delaware
Filed Dec. 13, 1965, Ser. No. 513,185
2 Claims. (Cl. 64—21)

ABSTRACT OF THE DISCLOSURE

A hydraulic pump or motor of the wobble plate type is provided with a ball and groove type universal joint driving connection. The joint includes outer and inner races each having a plurality of axial grooves. A plurality of torque transmitting balls are received within the grooves and are each axially engaged by a slidable shoe mounted on the inner race. The outer race includes a pair of locating rings each including a finger engaging each shoe to position the balls in the homokinetic plane. The shoes are provided with spherical cam surfaces that are engaged by mating spherical surfaces of followers universally mounted on the locating ring fingers.

---

My invention is directed to improvements in variable-ratio hydrostatic transmissions and is specifically concerned with provision of a durable economical universal joint for use in swash-plate pumps and motors of such transmissions.

The advantages of hydrostatic transmissions are great and are well known, but their application has been limited because of the high cost and limited durability of these machines. One reason for such high cost has been the necessity for providing expensive constant velocity universal joints and large expensive ball thrust bearings to locate the pressure plate and couple it to its shaft, these being disposed at an angle to each other.

My invention may be regarded as an improvement in increasing durability and reducing maintenance requirements of a hydraulic transmission of the sort generally described in United States patent application Ser. No. 417,645 of Arthur F. Anderson for Universal Joint, filed Dec. 11, 1964, now abandoned, which is of common ownership with this application. The Anderson application discloses a variable stroke pump for a hydrostatic transmission embodying a plain thrust bearing which is not adapted to accept transverse loads and a universal joint of the type in which the driving and driven members of the joint have races parallel to their axes within which balls are mounted to transfer torque. It also embodies means to guide the balls so that their centers remain substantially in a plane which makes equal angles with the axes of the driving and driven members. Such a structure has the advantage that the universal joint is relatively simple and inexpensive to make because of the straight axial ball races. Also, the plain thrust bearing is much cheaper than a ball thrust bearing. Moreover, the universal joint is relatively tolerant of axial misalignment of the coupled parts resulting from machining tolerances. However, the forces exerted on the balls in operation of the universal joint make it necessary that some force be exerted to maintain them in the proper axial relation to the driving and driven members. Parts through which this force is transmitted move relatively to each other, describing one oscillation for each revolution of the shafts, and there is a problem of wear associated with such a universal joint.

My invention embodies the general structure outlined briefly above but includes also means to minimize friction and spread the thrust between the relatively moving parts of the ball locating means over an adequate bearing area.

Figure 1:
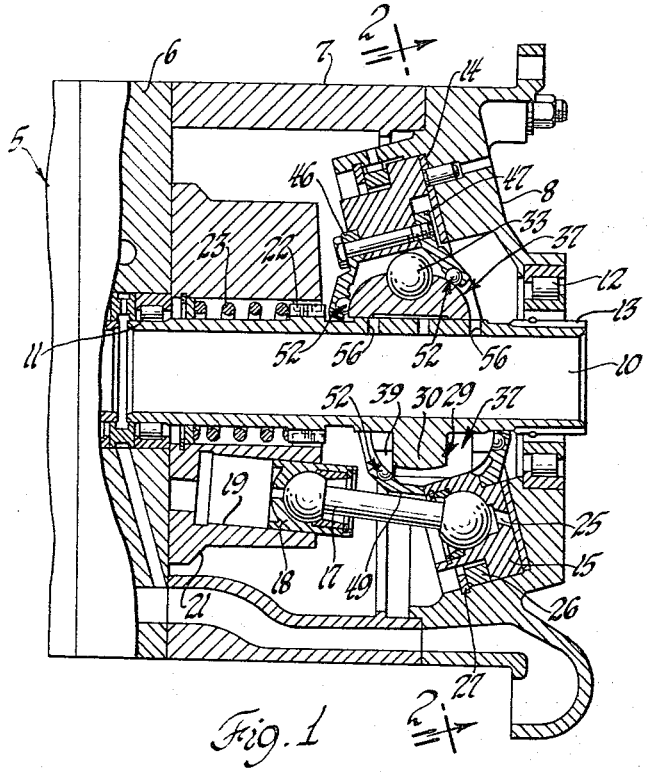
Figure 2:
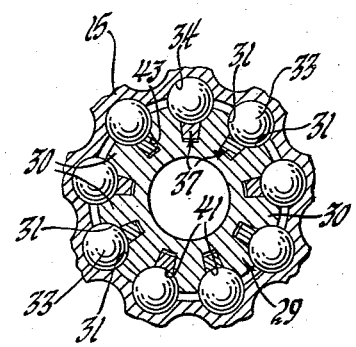
Figures 3, 4:
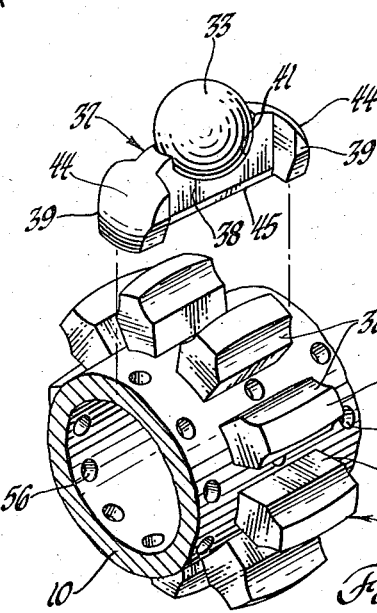

The nature of the invention and the advantages will be more fully apparent from the succeeding detailed description and the accompanying drawings in which: FIGURE 1 is a longitudinal sectional view of the motor portion of a hydrostatic transmission; FIGURE 2 is a partial sectional view on the plane indicated in FIGURE 1; FIGURE 3 is a fragmentary exploded axonometric view; and FIGURE 4 is an enlarged view of a follower.

In general, the hydraulic motor comprises a stationary housing 5 embodying a valve block 6, a motor case 7, and an end plate 8. A motor shaft 10 which may be coupled to the device to be driven is mounted in suitable bearings 11 and 12. The bearing 12 and spline 13 on shaft 10 may coact with the driven shaft (not illustrated). The end plate mounts an annular thrust bearing facing 14 disposed at an oblique angle to the axis of shaft 10. This may be a plain or a Kingsbury type bearing. It is more or less oil-floated in operation. A pressure plate 15 rotates against the thrust bearing 14. This pressure plate is actuated through connecting rods 17 by pistons 18 operating in cylinders 19 in a cylinder block 21 which rotates with shaft 10. The cylinder block 21 coacts with ports (not illustrated) in the valve block 6 and is coupled to shaft 10 by splines 22 and a compression spring 23 which maintains the cylinder block in engagement with the valve plate. The thrust bearing 14 is lubricated by means (not illustrated) from the cylinders 19 through the hollow piston rods 17 and passages 25. The pressure plate is held in place against the thrust bearing for assembly purposes by a ring 26 retained by a split ring 27.

Considering now the structure of the improved universal joint which connects the pressure plate 15 to the shaft 10, shaft 10 includes a flange 29 which has a spherical exterior surface and which is cut to provide nine projections or teeth 30 defining ball races 31 between them. Balls 33 engage the races 31 and also races 34 in the interior of pressure plate 15. Thus, the balls 33 are disposed in grooves or races which extend parallel to the axes of the normally driving and driven elements 15 and 10 to transmit torque between the two elements. They also serve as a radial bearing to transmit the radial component of the thrust load from the pressure plate to the shaft. With the pistons exerting an axial force on the plate, there will be a radial force component due to the angular disposition of the thrust surface 14.

For the structure to perform the function of transmitting torque and load without binding of the elements, the centers of balls 33 must travel substantially in a plane which makes equal angles with the axes of the shaft 10 and pressure plate 15. The balls are restrained axially of the motor by an arrangement including shoes 37, each of which has a web or intermediate portion 38 and two heads 39. The shoe is symmetrical about a plane containing the axis of shaft 10 and also about a plane perpendicular to that axis. At its center, it defines a part-spherical socket 41 for the ball 33. The web 38 is guided in a slot or keyway 43 in the flange 29 cut below the race 31 so that it can slide axially of the shaft 10. The outer faces of the heads 39 of the shoe are part-spherical cam surfaces 44, the surfaces being centered about points indicated generally at 45 in FIGURE 3. The location of the centers can be determined geometrically and may be modified empirically for best results in a particular machine.

The pressure plate or outer member 15 includes two shoe locating rings 46 and 47 which are similar except that the inner locating ring provides clearances at 49 for the connecting rods 17. Each of the locating rings 46 and 47 mounts nine followers 52 (FIG. 4). Each follower 52 has a spherical surface 53 disposed in a substantially hemispherical socket in the locating ring. As shown most clearly in FIGURE 4, each follower is a sphere cut away to provide a spherical concave face 55. The concave face 55 subtends approximately 130° as measured from the center of the face 53. The radius of the surface 53 is very slightly greater than that of the spherical cam surface 44 so that surface 53 conforms to surface 54 and slides easily over it by virtue of the oil film which exists between the surfaces due to the lubrication of the machine. Likewise, the convex surface of follower 52 is a close free-rotational fit in its socket in the locating plate. The sockets may be slightly staked to retain the balls in the locating plate when the machine is disassembled.

The universal joint may be lubricated by oil introduced into shaft 10 by means not shown. The oil may flow out through radial ports 56 in the shaft to flow between the shaft and the shoe and be distributed by centrifugal action to the followers and to the balls 33 and ball races.

In operation, as pressure plate 15 and shaft 10 rotate, the pressure plate describes a nutating or wobbling movement with respect to shaft 10. The followers 52 follow a generally circular path over the cam surfaces 44 of shoes 38. In so doing they guide the shoes back and forth in their slots 43, constraining the balls to remain in the desired plane making equal angles with the axes of rotation of the driving and driven members. Since the followers distribute the load over a substantial area, the structure is durable and maintenance is minimized. Operation at shaft inclinations up to 20° has been found feasible.

The detailed description of the preferred embodiment of the invention for the purpose of explaining the principles thereof is not to be considered as limiting or restricting the invention, as many modifications may be made by the exercise of skill in the art.

I claim:

1. In a device for converting rotary motion to or from reciprocating motion through a universal joint subject to substantial thrust forces, the universal joint including an inner race having axial grooves, an outer race having axial grooves each corresponding to an inner race groove to form corresponding groove pairs, a plurality of torque transmitting balls each received within a corresponding groove pair to drivingly interconnect the inner and outer races, a plurality of positioning shoes each mounted on one of the races and axially engaging one of the balls, and locating means mounted on the other race and operable to locate the shoes to position the balls in the homokinetic plane during joint angulation, the improvement comprising a convex cam surface formed on each shoe on each axial side of the ball and a plurality of followers universally mounted on the locating means and each having a concave surface substantially matingly engaging a positioning shoe cam surface to distribute the thrust forces transmitted between the inner race and the outer race over a substantial bearing area.

2. The combination of claim 1 wherein the positioning shoe cam surfaces are part-spherical and the follower concave surfaces are substantially matingly part-spherical.

References Cited

UNITED STATES PATENTS

| | | | |
|---|---|---|---|
| 2,137,487 | 11/1938 | Hall | 308—73 |
| 2,908,151 | 10/1959 | Wahlmark | 64—21 |
| 3,106,077 | 10/1963 | Sharp | 64—8 |
| 3,166,919 | 1/1965 | Kayser | 64—21 |
| 3,204,429 | 9/1965 | Kayser | 64—21 |

HALL C. COE, *Primary Examiner*.